UNITED STATES PATENT OFFICE.

DAVID J. JOSLIN, OF SAN DIEGO, CALIFORNIA.

PAINT.

No. 827,534.　　　Specification of Letters Patent.　　　Patented July 31, 1906.

Application filed January 18, 1906. Serial No. 296,628.

*To all whom it may concern:*

Be it known that I, DAVID J. JOSLIN, a citizen of the United States, residing at San Diego, in the county of San Diego and State of California, have invented certain new and useful Improvements in Paints, of which the following is a specification.

My invention relates to improvements in paints, and has for its object the production of a paint which will have a long life and will not become tacky or chalky and can be kept in open vessels without injury.

Further objects of the invention are to provide a paint which will be a perfect rust preventive and destroyer and will not be affected by climate, salt air, or salt water.

With these and other objects in view my invention consists of a paint embodying certain ingredients and combined in the proportions and by the methods herein specified.

To produce one gallon of my paint, (and in like proportions for larger quantities,) I dissolve one-sixteenth (1/16) of an ounce of concentrated lye (or its equivalent) in one pint of water, which I then mix with two pints of linseed-oil (or its equivalent) in a metallic vessel over a brisk fire, constantly stirring the same until it boils, and while briskly boiling and stirring I add thereto about eight pounds of dry princ metallic (powdered iron ore or iron oxid) or any other base or body for paints or pigment or coloring-matter. This boiling and stirring process is continued until the water is substantially eliminated and the ingredients perfectly mix and blend, thereby producing a paint in the form of a paste to which there can be added three pints of linseed-oil. The paint thus produced may be still further thinned at any time thereafter without injury by adding more linseed-oil or its equivalent. The density of the solution depends upon the nature of the work for which it is required.

I do not limit myself to the proportions stated, as it may be found necessary to slightly vary the proportions of the ingredients, depending upon the strength of the lye and the weight and character of the base, body, pigment, or coloring-matter that may be used.

If the concentrated lye is too strong, it will prevent the perfect mixing and blending of the ingredients while being boiled and stirred and will cause them to curdle, in which case more linseed-oil and princ metallic (or equivalents) must be added until the ingredients mix and blend perfectly.

The water used to dissolve the concentrated lye (or equivalent) constitutes practically no part of the finished product, as the more completely it is eliminated by the boiling and stirring process the more perfect is the paint. The water serves only to reduce the strength of the lye, (or equivalent,) so that it will properly combine with the linseed-oil (or equivalent) while being boiled and stirred.

I may produce all colors and kinds of paints, and accordingly changes must be made in the proportions of ingredients composing the same, according to the weight of the materials used, as the minerals used for the different kinds and colors of paints vary in weight.

I have found by experience that my paint can be made in all kinds and colors and is easily applied to all kinds of woods and metals, readily and tenaciously adhering thereto, and becoming very hard and firm. It can be successfully used in all climates and will not run, crack, or become sticky and chalky. By eliminating the water from the finished product the paint is absolutely rust curative and preventive and has a fine finish or gloss. On account of the substantial materials composing the paint it will be readily understood that it is very lasting and durable and possesses many valuable qualities.

I claim—

1. A paint composed of one-sixteenth ounce concentrated lye, two pints linseed-oil, and eight pounds princ metallic.

2. A paint composed of one-sixteenth ounce concentrated lye, two pints linseed-oil, eight pounds princ metallic, the same being stirred and boiled until reduced to a paste, three pints linseed-oil being added to the paste.

3. The process of preparing paint, consisting in mixing water with concentrated lye, adding thereto linseed-oil and princ metallic, constantly stirring the mixture while adding the princ metallic and boiling until the water is practically eliminated from the finished product.

4. The method of producing paint consisting of dissolving one-sixteenth ounce concentrated lye in one pint of water, mixing in two pints linseed-oil, causing the mixture to boil, and while constantly stirring, adding thereto about eight pounds princ metallic, and when the mixture is reduced to paste, adding about three pints linseed-oil, the water being eliminated from the finished product during the boiling process.

In testimony whereof I affix my signature in presence of two witnesses.

DAVID J. JOSLIN.

Witnesses:
  ALFRED HAINES.
  T. J. McFERON